BENJAMIN F. ATWOOD, OF NEW YORK, N. Y.

Letters Patent No. 83,440, dated October 27, 1868.

IMPROVED COMPOUND TO BE APPLIED TO THE HAIR.

The Schedule referred to in these Letters Patent and making part of the same.

*To all whom it may concern:*

Be it known that I, BENJAMIN F. ATWOOD, of the city, county, and State of New York, have invented a new and improved Compound for Promoting the Growth of the Hair; and I do hereby declare that the following is a full, clear, and exact description thereof, which will enable others skilled in the art to make and use the same.

The object of this invention is to provide a vegetable hair-dressing which will strengthen the hair, and promote its healthy growth.

It has been found, by ample practical test, to promote the growth of hair where the same has been lost from fever, and will accomplish this end in all cases where the hair-follicles are not completely closed, and the scalp left smooth and glabrous.

It is composed entirely of vegetable matter, consisting chiefly of a decoction of quince-seed, smart-weed, (so called,) sage, sweet fern, and hemlock-bark.

The active or stimulating ingredients are the quince-seed and smart-weed. The other ingredients are accessory, and may be substituted by other vegetable matter having analogous properties.

The active principle derived from the quince-seed, I deem to act by affording the nourishing elements required by the diseased or debilitated hair-follicles, while the active principle of the smart-weed stimulates the follicles, rousing them from the torpid state in which they are left by disease, and rendering them capable of being aided by the nutritive properties obtained from the quince-seed.

Upon these two ingredients, the efficiency of the compound mainly depends.

The other ingredients are added to contribute, from their several properties, aid to the two principal ingredients, but may, however, be omitted.

The sage is a bland stimulant.

The hemlock-bark is a mild astringent, having a tonic effect.

The sweet fern is softening and cooling in its action upon the hair.

I usually take equal weights of the ingredients, and obtain a strong decoction of them, to which is added a little glycerine and alcohol, although either or both may be omitted.

The formula stands thus:

I. Quince-seed,  
   Smart-weed,  
   Sage,             } One ounce.  
   Sweet fern,  
   Hemlock-bark,  
   Rain-water, one quart.  
   Glycerine, six ounces.  
   Alcohol, two gills.

As before stated, the active ingredients are the quince-seed and smart-weed. When these alone are used, the formula will stand thus:

II. Quince-seed, } One ounce.  
    Smart-weed,  
    Rain-water, three half-pints.

As in the first formula, the glycerine and alcohol may be omitted.

Having thus described my invention,

What I claim as new, and desire to secure by Letters Patent, is—

1. A hair-stimulating compound, consisting chiefly of a decoction of quince-seed and smart-weed, substantially as herein described, as a new article of manufacture.

2. The addition, to the said quince-seed and smart-weed, of sage, sweet fern, and hemlock-bark, to form a modification of the compound, substantially as described, the whole being softened with glycerine, all as set forth.

BENJAMIN F. ATWOOD.

Witnesses:
FRANK BLOCKLEY.
ALEX. F. ROBERTS.